United States Patent
Injarapu et al.

(10) Patent No.: US 12,373,291 B1
(45) Date of Patent: Jul. 29, 2025

(54) TRANSIENT FAULT DETECTION IN MEMORY USING DYNAMIC BIST

(71) Applicant: QUALCOMM Incorporated, San Diego, CA (US)

(72) Inventors: Sateeshkumar Injarapu, Bangalore (IN); Amit Duggal, Bangalore (IN); Manish Kumar Saxena, Bangalore (IN); Nitin Jaiswal, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 76 days.

(21) Appl. No.: 18/422,934

(22) Filed: Jan. 25, 2024

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/0772* (2013.01)

(58) Field of Classification Search
CPC . G06F 11/1068; G06F 11/076; G06F 11/0772
USPC .................. 714/764, 25, 30, 34, 42, 57, 768
See application file for complete search history.

(56) References Cited

U.S. PATENT DOCUMENTS

| | | | |
|---|---|---|---|
| 4,872,165 A | 10/1989 | Mori et al. | |
| 11,960,351 B1* | 4/2024 | Modi | G06F 11/004 |
| 2016/0283339 A1* | 9/2016 | Yamate | G11C 11/417 |
| 2018/0349222 A1* | 12/2018 | Hashizume | G06F 11/1068 |
| 2019/0051370 A1* | 2/2019 | Azam | G11C 29/36 |
| 2019/0190540 A1* | 6/2019 | Tsuboi | H03M 13/616 |
| 2024/0202086 A1* | 6/2024 | Soubhi | H03M 13/015 |
| 2024/0227825 A1* | 7/2024 | Aneja | G06F 11/2284 |

* cited by examiner

Primary Examiner — John J Tabone, Jr.
(74) Attorney, Agent, or Firm — Loza & Loza, LLP

(57) ABSTRACT

A method for managing a plurality of imaging devices in a vehicle includes determining that a change of data security mode is indicated for frames of image data transmitted over a first data communication link, determining whether a sensor management system has sufficient processing capacity to support the change of data security mode, increasing the processing capacity of the sensor management system by modifying data security settings for at least one other data communication link when the processing capacity of the sensor management system is insufficient to support the change of data security mode, and initiating the change of data security mode when the sensor management system has sufficient processing capacity to support the change of data security mode. The change of data security mode may include a change from an application-based to a link-based data security mode or a change from the link-based to the application-based data security mode.

20 Claims, 9 Drawing Sheets

TRANSIENT FAULT DETECTION IN MEMORY USING DYNAMIC BIST

TECHNICAL FIELD

The present disclosure relates generally to detection of faults in memory devices, and more particularly to distinguishing between transient and permanent faults in operational systems.

BACKGROUND

Vehicles, including automobiles, trucks, watercraft and other types of vehicle are increasingly fitted with complex electronic systems that are used for system management, control, and security. For example, it is common for vehicles to include a navigation system that, in many instances, can be used to support autonomous operation of the vehicle. In the latter example, a control system may communicate with the navigation system, a steering system and a powertrain or other propulsion system in addition to a variety of sensors that provide feedback used to control operation of the vehicle. The various systems in a vehicle may be implemented using a variety of components such as circuit boards, integrated circuit (IC) devices, application-specific integrated circuit (ASIC) devices and/or System-on-Chip (SoC) devices. The types of components may include processing circuits, user interface components, storage and other peripheral components. A communication infrastructure may be provided to support data communication within and between various systems or subsystems. The communication infrastructure may include some combination of wireless and wired communication links.

Automobiles are increasingly subject to, or dependent upon safety standards and risk classification schemes in order to manage the significant risk that automobiles traveling at speed pose to passenger and pedestrian lives. Certain safety standards are defined by the International Organization for Standardization (ISO) standard for "Functional Safety For Road Vehicles," which may be referred to herein as "ISO 26262." ISO 26262 defines functional safety as "the absence of unreasonable risk due to hazards caused by malfunctioning behavior of electrical or electronic systems." ISO 26262 defines an Automotive Safety Integrity Level (ASIL) risk classification scheme that stipulate or recommend various safety requirements. A vehicle function or system may be classified in one of four progressively more stringent ASIL levels: ASIL-A, ASIL-B, ASIL-C, and ASIL-D. ASIL-A includes the lowest or least stringent integrity requirements, and ASIL-D includes the highest or most stringent integrity requirements.

Certain ASIL levels relate to processing and communication of information within an automobile, including the use or operation of communication systems that define or control wired or wireless communication systems deployed or supported within a vehicle. Examples of wireless communication systems include systems managed using certain standards defined by the Institute of Electrical and Electronics Engineers (IEEE) 802.11 Working Group, the Bluetooth® standards defined by the Bluetooth Special Interest Group (SIG) and radio access standards defined by the 3rd Generation Partnership Project (3GPP). Examples of wired communication systems include systems managed using Peripheral Component Interconnect Express (PCIe), Advanced extensible Interface (AXI), HyperTransport and InfiniBand standards or protocols. Other examples of wired communication systems include systems managed using standards defined by the Mobile Industry Processor Interface (MIPI) Alliance and the CAN bus Standard promulgated by the International Organization for Standardization (ISO).

As device technology improves, there is an ongoing need to improve the resilience, reliability and availability of automotive systems.

SUMMARY

Certain aspects of the disclosure relate to systems, apparatus, methods and techniques that enable a dynamic self-test procedure to identify transient faults that exhibit in a memory system, module or device during normal system operation that commence after system initialization has been completed.

In various aspects of the disclosure, a self-test circuit, includes a counter clocked by a fault indication output by an error correction code (ECC) decoder and a controller activated by a fault interrupt signal asserted by the ECC decoder. The controller may be configured, when activated, to iteratively read first data from a memory location that is indicated by the ECC decoder to be associated with a data storage fault, cause an inverted version of the first data to be written back to the memory location, read second data from the memory location after the inverted version of the first data is written back to the memory location, report the data storage fault as a transient fault to a safety subsystem when the second data has an expected value, and report the data storage fault as a permanent fault to the safety subsystem when the second data does not have the expected value and an output of the counter reaches a threshold value. The controller may be deactivated when the data storage fault is reported as a transient fault or as a permanent fault to the safety subsystem.

In various aspects of the disclosure, a method for testing memory using a controller, includes activating the controller when a fault interrupt signal is asserted by an ECC decoder. While the controller is activated, the method include iteratively reading first data from a memory location that is indicated by the ECC decoder to be associated with a data storage fault, causing an inverted version of the first data to be written back to the memory location, reading second data from the memory location after the inverted version of the first data is written back to the memory location, reporting the data storage fault as a transient fault to a safety subsystem when the second data has an expected value, and reporting the data storage fault as a permanent fault to the safety subsystem after a threshold number of iterations has been executed in which the second data does not have the expected value. The controller may be deactivated when the data storage fault is reported as a transient fault or as a permanent fault to the safety subsystem.

In various aspects of the disclosure, a processor-readable storage medium includes or maintains code that, when executed by a controller in a processing circuit, causes the processing circuit to activate the controller when a fault interrupt signal is asserted by an ECC decoder. While the controller is activated, the code causes the processing circuit to iteratively read first data from a memory location that is indicated by the ECC decoder to be associated with a data storage fault, cause an inverted version of the first data to be written back to the memory location, read second data from the memory location after the inverted version of the first data is written back to the memory location, report the data storage fault as a transient fault to a safety subsystem when the second data has an expected value, and report the data storage fault as a permanent fault to the safety subsystem after a threshold number of iterations has been executed in which the second data does not have the expected value. The controller may be deactivated when the data storage fault is reported as a transient fault or as a permanent fault to the safety subsystem.

In certain aspects implementations, the controller is further configured to receive a fault signature from the ECC decoder. The fault signature may be received when the fault interrupt signal is asserted. The fault signature may include a memory device identifier. The fault signature may include an address of the memory location that is indicated as being associated with the data storage fault. The fault signature may include an ECC associated with the fault indication. In some implementations, the fault signature includes the memory device identifier, the address of the memory location, and the ECC associated with the fault indication.

In one aspect, the safety subsystem is provided in an autonomously operated vehicle and is operationally isolated from a processing circuit that comprises a memory device that includes the memory location. Incoming access requests directed to a memory device that includes the memory location may be halted while the controller is activated.

In one aspect, the threshold value is configured by the safety subsystem. The threshold value may correspond to a number of data reads or data writes that ensures that a transient fault is cleared before the data storage fault is reported as a transient fault or as a permanent fault to the safety subsystem.

DETAILED DESCRIPTION

Figure 1:
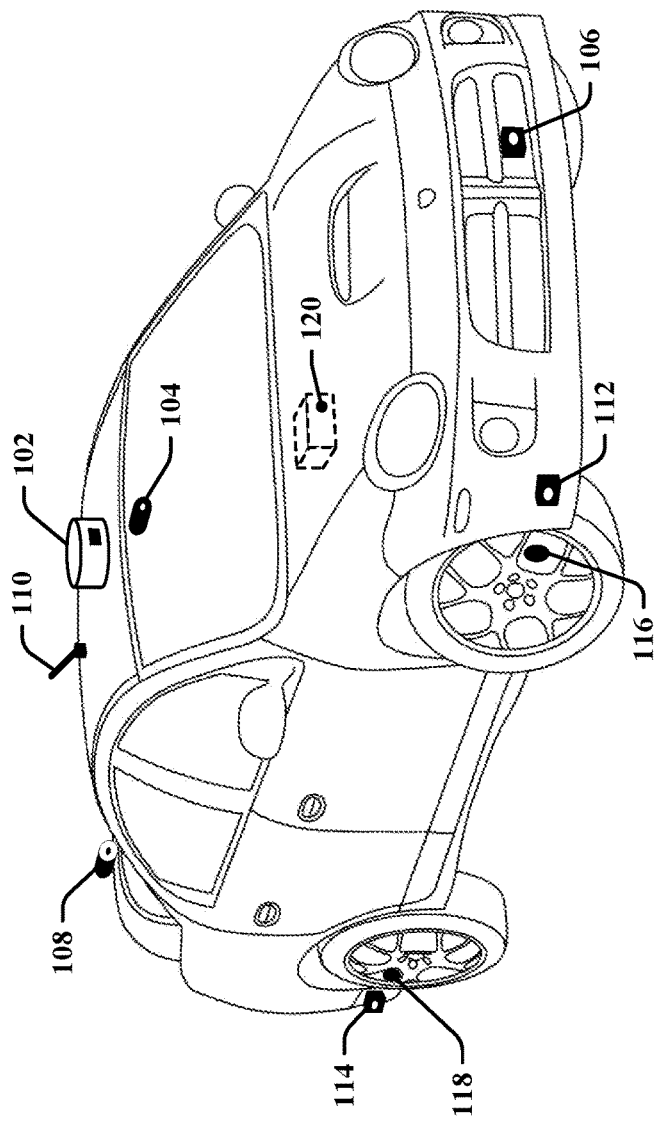
FIG. 1 illustrates an example of systems in an automobile that may be adapted, configured or operated in accordance with certain aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In certain implementations disclosed herein, bus architectures may be deployed to support inter-processor communication, inter-device communication, sensor support, high-speed communication and/or memory interfaces. Some communication interfaces employ bus architectures or protocols defined by Peripheral Component Interconnect Express (PCIe), Advanced extensible Interface (AXI), HyperTransport and InfiniBand standards or protocols. Certain examples described herein may be implemented using wired communication links to interconnect different parts of a vehicle, including multidrop serial buses that are operated in accordance with a standardized or proprietary protocol. In some examples, high-speed serial buses are operated in accordance with standards defined by the Mobile Industry Processor Interface (MIPI) Alliance, such as the Improved Inter-Integrated Circuit (I3C), Radio Frequency Front-End (RFFE), system power management interface (SPMI), camera serial interface (CSI) and display serial interface (DSI) standards. In some examples, the Controller Area Network (CAN) vehicle bus standard may be used in a vehicle to provide a message-based protocol that supports prioritized multidrop operation in which bus contention is resolved by permitting the highest priority contending device to transmit while devices with lower priority refrain from transmitting according to a back off procedure. Certain implementations of the CAN bus are described in the CAN Standard promulgated by the International Organization for Standardization (ISO).

Some or all of the examples described herein may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Wired data communication links are used to facilitate the description of certain concepts herein. However, these concepts can also be applied to wireless communication links in many implementations. For example, physical communication interfaces can be implemented using either wired and wireless transceivers, or some combination of wired and wireless transceivers. The physical connection between devices may include a wire or a wireless propagation path.

Certain systems and/or processing circuits may be used to automate features and functions of a vehicle. For example, camera-based systems, proximity indicators, speed and velocity detectors and other systems may provide images and other information that can be used to assist an operator of the automobile. In one example, the images and other information enable the identification of potential hazards, proximate objects, presence of pedestrians and other traffic and/or road conditions. In some instances, a combination of systems and/or processing circuits can enable autonomous operation of an automobile, and can provide feedback and other information to security and vehicle access management systems and to driver assistance systems, including forward collision warning systems, lane departure warning systems, rear cross traffic warning system, blind spot warning systems, vehicle reverse imaging systems, parking assistance, and other driver assistance systems. These and other systems may use some combination of cameras, sensors and location systems including systems based on motion detection sensors and/or ranging sensors that use visible, infrared or radio frequency signals or ultrasonic detection systems.

Examples of sensor management systems provided throughout this disclosure use cameras as a primary example of a type of sensor. However, the concepts, architectures, systems, apparatus, techniques and methods disclosed in these examples applies equally to other types of sensors and/or motion or location detection systems.

Certain systems and/or processing circuits may support one or more displays provided within the vehicle. For example, a display subsystem may serve as an instrument panel, an entertainment or media center, one or more view panels that are accessible to passengers, a heads-up display of control information and instruments, and so on. Certain systems and/or processing circuits may manage, configure and control environmental conditions with a cabin of the vehicle, including heating, cooling, lighting and seat configurations.

FIG. 1 illustrates an example of an automobile 100 that includes systems that may be adapted, configured or operated in accordance with certain aspects of this disclosure. The automobile 100 may be equipped with multiple imaging or sensing devices including, for example, the illustrated cameras or sensors 102, 104, 106, 108, 112, 114. The automobile 100 may include sensors such as tire pressure or braking sensors 116, 118. The automobile 100 may also include one or more antennas 110 used for radio frequency reception, wireless communication and/or radio navigation using a global positioning system (GPS). A central controller 120 may be coupled to each of the cameras 102, 104, 106, 108, 112, 114, sensors 116, 118 and antennas 110. The central controller 120 may configure and manage automated systems and/or driver assistance systems. In some implementations, the central controller 120 may be configured to operate as an engine control unit that manages the operation and performance of the engine, motor, motors or other power systems in the automobile 100. In some instances, the central controller 120 may be embodied in an SoC.

Robust data communication links are needed to support the large number of cameras deployed within the automobile 100. In some examples, 20-30 cameras may be deployed to support automation and driver assistance systems. Each camera may be capable of generating data at a rate of between 1-10 gigabits per second (Gbps) resulting in aggregate data rates of up to 300 Gbps. The communication of this volume of data can be expected to result in the consumption of high levels of power and the generation of associated heat from interface and data protection and processing circuits. In conventional systems, data rates may be reduced to control power consumption and heat generation, resulting in loss of image quality.

Figure 2:
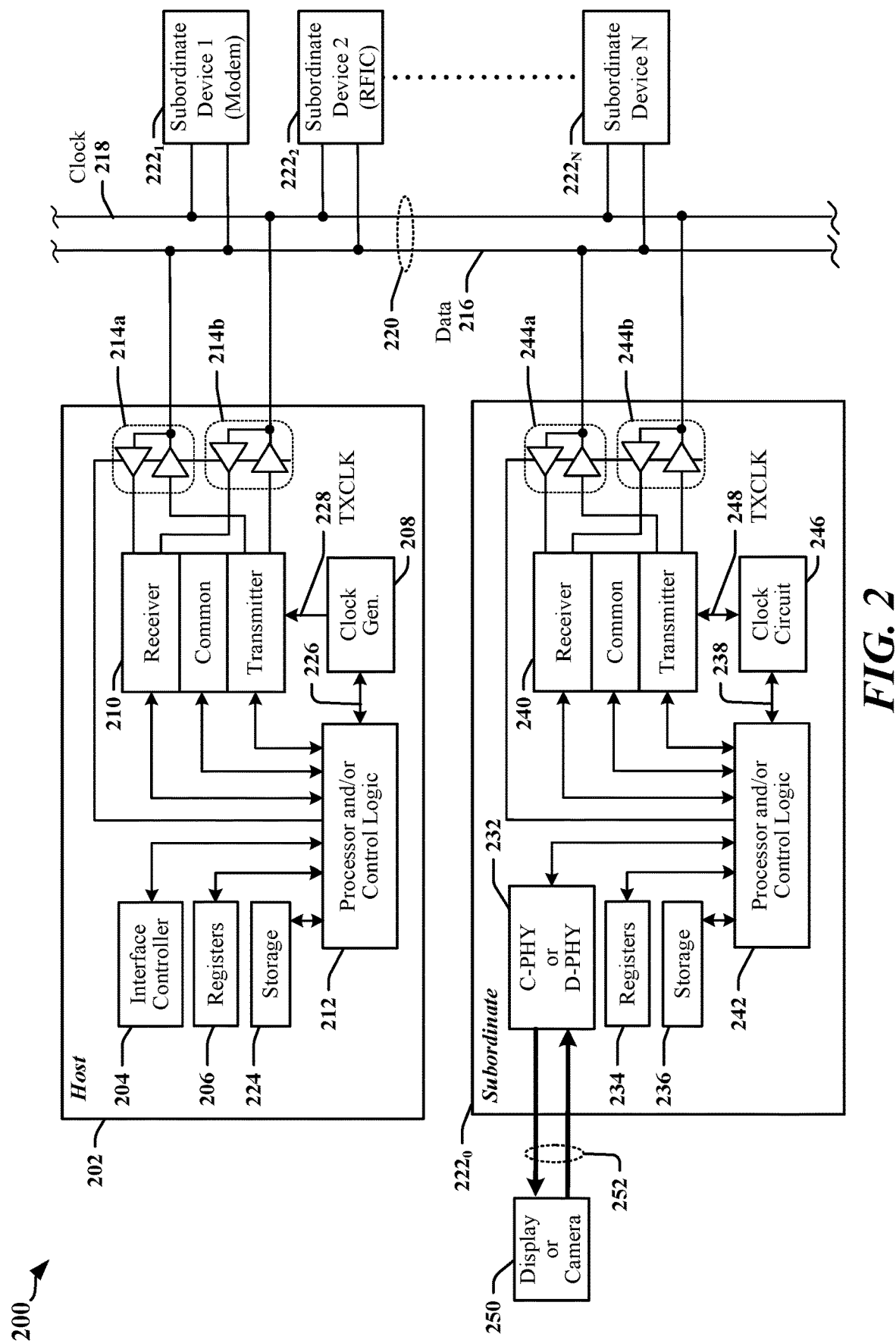
FIG. 2 illustrates an example of an apparatus in a vehicle subsystem that may be adapted in accordance with certain aspects of this disclosure.

FIG. 2 illustrates an example of a system 200 that may be incorporated in a vehicle subsystem that includes sensors and at least one controller that may be adapted in accordance with certain aspects of this disclosure. In the illustrated example, the system 200 includes multiple devices 202, and $222_0$-$222_N$ coupled to a two-wire serial bus 220. The devices 202 and $222_0$-$222_N$ may be implemented using an SoC and/or one or more semiconductor IC devices. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a host device 202 that serves as a bus master. Certain types of bus can support multiple bus masters.

In one example, a host device 202 may include an interface controller 204 that can manage access to the serial bus, configure dynamic addresses for subordinate devices and/or generate a clock signal 228 to be transmitted on a clock line 218 of the serial bus 220. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a subordinate device on the serial bus 220 and may include circuits and modules that support a display, an image sensor, and/or circuits and modules that control and communicate with one or more sensors that measure environmental conditions. In one example, a device $222_0$ configured to operate as a subordinate device may provide a control function, physical layer circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with CAN bus protocols promulgated by the International Organization for Standardization (ISO), Ethernet, Inter-Integrated Circuit (I2C or $I^2C$) protocols, Improved Inter-Integrated Circuit (I3C) protocols, Radio Frequency Front-End (RFFE) protocols, system power management interface (SPMI) protocols, serial peripheral interface (SPI) protocols, or other suitable protocols. In some instances, two or more devices 202, $222_0$-$222_N$ may be configured to operate as a host device on the serial bus 220. In some instances, the system 200 includes multiple serial buses 220, 252a and/or 252b that couple two or more of the devices 202, $222_0$-$222_N$ or one of the devices 202, $222_0$-$222_N$ and a peripheral device such as a display or camera 250. In some examples, one subordinate device $222_0$ is configured to operate as a display or camera coupled to a display or camera 250. The latter subordinate device $222_0$ may include a physical layer circuit 232 that is configured to enable communication with the display or camera 250 over a bus 252.

One or more of the devices 202, $222_0$-$222_N$ may be implemented in an SoC that provides a standardized or proprietary bus architecture for interconnecting the devices. In one example, an SoC may be implemented using multiple chiplets mounted on a common chip carrier and coupled through data communication buses operated according Universal Chiplet Interconnect Express (UCIe). In another example, an SoC may include one or more data communication buses that are operated in accordance with Advanced High-Performance Bus (AHB) protocols defined by Advanced Microcontroller Bus Architecture (AMBA) specifications. Other bus architectures or protocols may be employed to satisfy design or application requirements. Examples of other types of bus architectures or protocols are defined by CAN, Ethernet, RFFE, I2C, I3C, SPMI, PCIe, AXI, HyperTransport and InfiniBand standards or protocols. Certain bus architectures may be deployed to support inter-processor communications, inter-device communications, sensor support, high-speed communication and/or memory interfaces.

Figure 3:
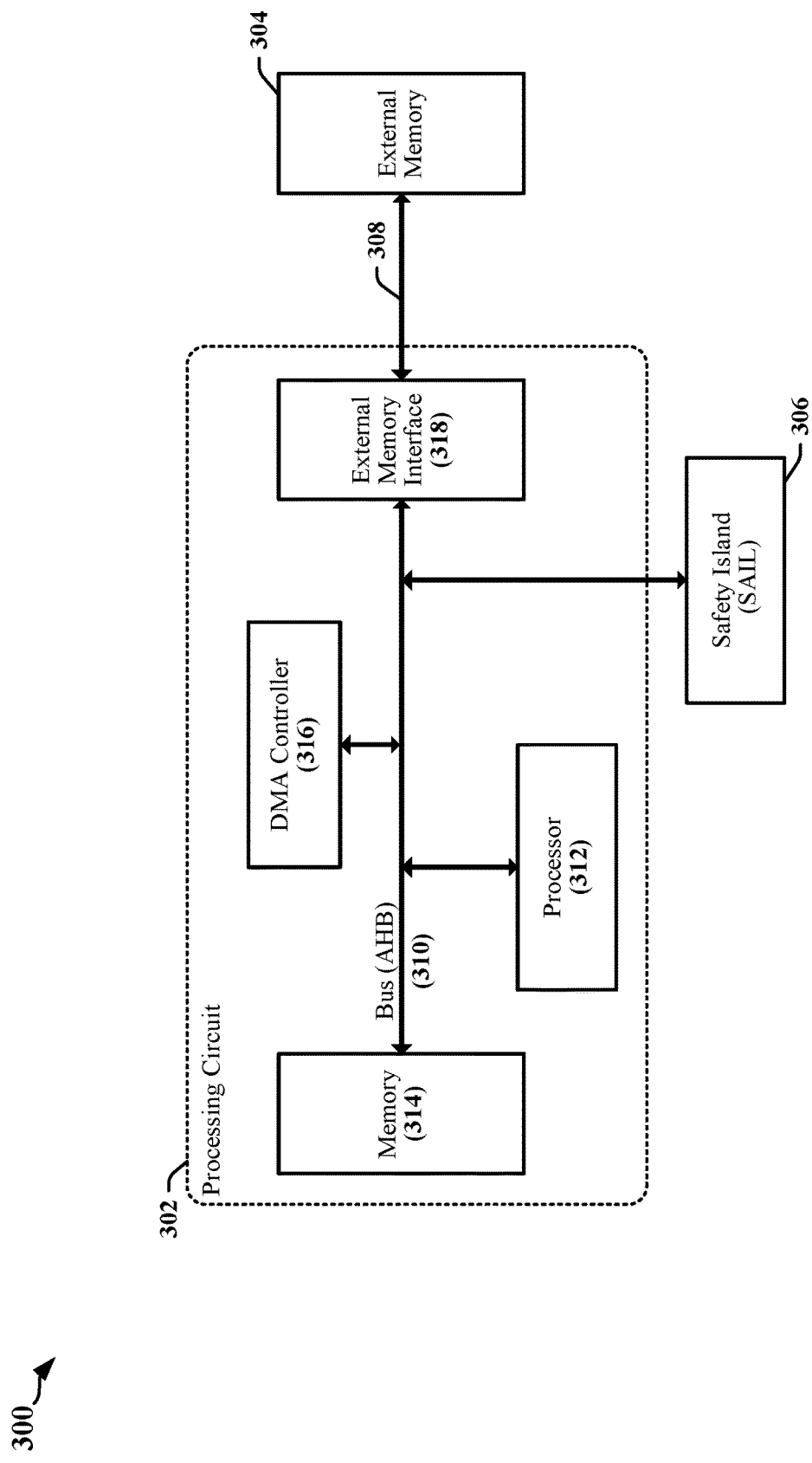
FIG. 3 illustrates a system that may be adapted or configured in accordance with certain aspects of this disclosure.

FIG. 3 illustrates a system 300 that includes a processing circuit 302 that may be adapted or configured in accordance with certain aspects of this disclosure. In one example, the processing circuit 302 may be included in the host device 202 illustrated in FIG. 2. In another example, the processing circuit 302 may be included in a subordinate device, and may be associated with one or more of the other devices $222_0$-$222_N$ illustrated in FIG. 2. Certain aspects of the processing circuits 702 and 902 illustrated in FIGS. 7 and 9 may apply to the processing circuit 302.

The processing circuit 302 may be implemented within an SoC and includes a processor 312 that is coupled through a system bus 310 to internal memory 314 and external memory 304. The internal memory 314 and external memory 304 can be used to store code, data, configuration and status information. The system bus 310 may be operated in accordance with AHB protocols. A direct memory access controller (e.g., the DMA controller 316) may be coupled to the system bus 310 to permit other processors, peripherals or devices to access the internal memory 314 and/or external memory 304. A memory interface 318 or memory controller may be coupled to the system bus 310. The memory interface 318 may be further coupled to the external memory 304 through a separate or external memory bus 308.

Other peripherals may be coupled to the system bus 310. For example, one or communication interfaces is typically coupled to the system bus 310 in order that the processor 312 may communicate or control one or more sensors, displays, cameras, wireless communication modems and/or other processing circuits.

In the illustrated example, a safety island 306 is coupled to the system bus 310. The safety island 306 is a safety subsystem or circuit that may be implemented within the same SoC that includes the processing circuit 302. In some implementations, the safety island 306 is provided external to the SoC that includes the processing circuit 302. The safety island 306 may be configured to manage built-in self-test (BIST) sub-systems and to monitor subcircuits of the SoC during operation. In some implementations, the safety island 306 may be configured to manage a BIST controller that monitors a memory component, and which may be referred to herein as an MBIST controller. The safety island 306 includes circuits that can identify or be alerted to fault conditions or failures during normal operation. The safety island 306 may be configured to force restart of some subcircuits or of the entire system 300 as needed to recover from fault conditions or failures. The safety island 306 may be configured to signal system failure through external display or notification systems.

The safety island 306 is typically expected to continue to function when faults and failures have occurred within the system 300. Accordingly, the safety island 306 is typically isolated from the operation of other subsystems and circuits. In some implementations, the safety island 306 includes a dedicated processing circuit, dedicated memory, and independent clock generation or delivery circuits. In some implementations, the safety island 306 may be allocated dedicated input/output (I/O) pins and associated circuits. In some implementations, the safety island 306 may be provided with independent access to communication interfaces. The safety island 306 may be powered independently of the processing circuit 302.

The four Automotive Safety Integrity Level (ASIL) levels in the ISO 26262 risk classification scheme are associated with levels of performance, accuracy and reliability stipulated for systems and data to ensure acceptable levels of functional safety in different autonomous driving modes. In one example, ASIL-D defines levels of performance, accuracy and reliability associated with the highest degree of automotive risk, including airbags, anti-lock brakes, and power steering. In another example, ASIL-A defines levels of performance, accuracy and reliability associated with the lowest degree of automotive risk, including rear lights. In another example, ASIL-B defines levels of performance, accuracy and reliability for head lights, brake lights and the like. In another example, ASIL-C defines levels of performance, accuracy and reliability for systems such as cruise control.

Levels of performance, accuracy and reliability in memory devices may be defined by ASIL-B. ASIL-B requires that data stored in memory devices are protected using an error correction code (ECC). The ECC may be generated as a Hamming code, a Hsiao code, a Reed-Solomon error correction code, or the like. The ECC may provide for single-bit error correction and double-bit error detection (SEC-DED). Memory devices that use an ECC can protect against data corruption caused by electromagnetic interference events and other events that can cause the value of a single bit to flip. ECC circuits in a memory device can also detect localized failure in the value stored at a location of the memory device is corrupted due to the value of one or more bits of the storage location being permanently fixed or locked. ECC circuits in a memory device may be configured to report memory faults, such as bit errors, to the safety island 306.

Figure 4:
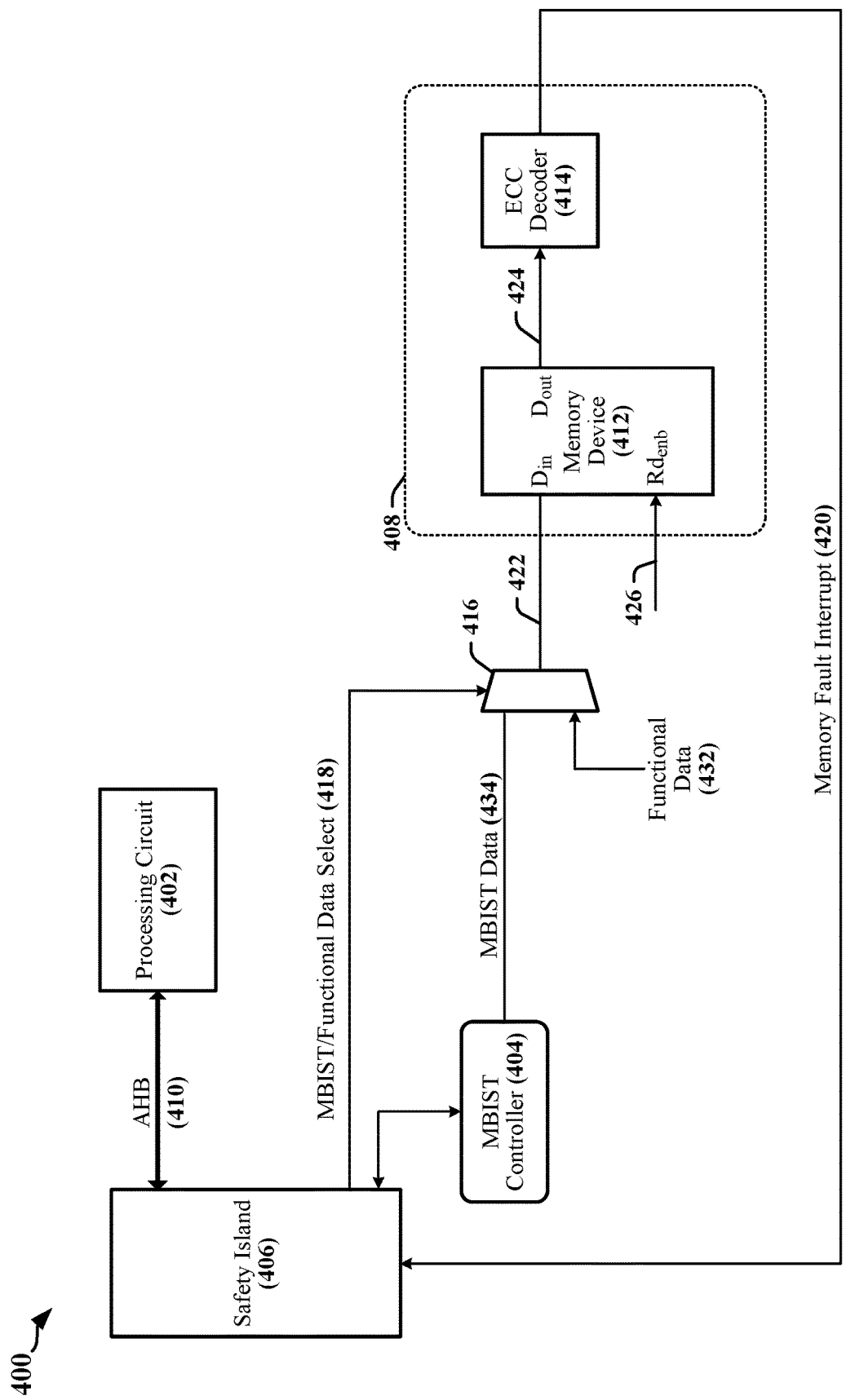
FIG. 4 illustrates a configuration of subsystems and circuits that may be used to perform self-testing.

FIG. 4 illustrates a configuration of subsystems and circuits 400 that may be used to perform self-testing during initialization of the processing circuit 302 illustrated in FIG. 3. The illustrated self-testing is directed to a memory component 408. In the illustrated example, the memory component 408 corresponds to the external memory 304 coupled to the processing circuit 302. In other examples, the memory component 408 corresponds to the internal memory 314 of the processing circuit 302. The memory component 408 includes one or more memory devices 412 providing an addressable memory space spanning an address range, and an ECC decoder 414 configured to identify data corruption. The ECC decoder 414 may assert a memory fault interrupt 420 that causes one or more circuits or modules in a safety island 406 to initiate corrective action, and/or to notify an operator or other elements of an autonomous or driver operated vehicle of the potential consequences of the data corruption. The safety island 406 may be coupled to the processing circuit 402 through a bus 410 that is operated in accordance with AHB protocols, and may receive one or more signals from the memory component 408.

The safety island 406 may be configured to manage or monitor the operation of an MBIST controller 404 that may be used to test certain aspects of the performance, accuracy and reliability of a memory component 408. In one example, the MBIST controller 404 may be implemented using a finite state machine. In another example, the MBIST controller 404 may be implemented using a processing circuit. The MBIST controller 404 is used during system initialization or after a fault condition has been detected and the system, processing circuit 302 or memory component 408 is being reset or reinitialized. In one example, a circuit in the safety island 406 may provide a control signal 418 to a multiplexer 416 that selects between a test datastream 434 and functional data 432. The test datastream 434 may also be referred to as MBIST data. Functional data 432 is received during normal operation of the system, The system may be operating normally when it is performing one or more functions for which it was designed or configured. The safety island 406 may cause the MBIST controller 404 to generate other memory control signals (not shown) in order to enable data to be written to the memory component 408 and to be read from the memory component 408 during testing. For example, the MBIST controller 404 may override a read enable signal 426 provided to the memory devices 412 for normal operation with a test version of the read enable signal during testing.

During testing the multiplexer 416 selects the test datastream 434 to be provided as the data input 422 of the memory devices 412. The test datastream 434 may be written to multiple locations across the address range of the memory component 408. In one example, test data is written to every address in the address range. In another example, test data is written to random addresses throughout the address range. The MBIST controller 404 may test the memory devices 412 to ensure the integrity of the stored data. In some implementations, the MBIST controller 404 may obtain a regenerated test datastream 424 by reading the data that was stored at the multiple locations during writing. The ECC decoder 414 may check the ECC information associated with the regenerated test datastream 424 to determine whether the regenerated test datastream 424 includes errors. The regenerated test datastream 424 is expected to match the original test datastream 434. If a difference is detected or discovered, the ECC decoder 414 may assert the memory fault interrupt 420.

The safety island 406 may initiate one or more additional memory tests when the memory fault interrupt 420 is asserted. Additional memory tests may be performed to determine if a reported fault is permanent or transient. The safety island 406 may cause certain memory locations to be excluded from available memory when the reported fault is permanent. Circuits or modules within the safety island 406 may determine the criticality of the fault and may take further action based on such determination.

The circuits or modules within a conventional safety island 406 are unable to distinguish between permanent and transient faults during normal operations. The safety island 406 responds to a fault indication by causing the affected subsystem to be reset and tested during reinitialization. In the example of illustrated in FIG. 4, circuits or modules within the safety island 406 respond to assertion of the memory fault interrupt 420 by causing the memory component 408 to be reset. In some instances, the circuits or modules responsive to memory faults within the safety island 406 may further respond to assertion of the memory fault interrupt 420 by causing the processing circuit 402 to be reset. The reset and reinitialization of the memory component 408 can cause significant increases in system latency and decreases in performance. Latency may refer to delays in processing or delays in responding to messages, interrupts, commands, device-generated real-time events and/or events generated based on sensor-generated data or status. In some instances, latency may be measured as the time elapsed between receipt of a message, interrupt or command and the response to the message, interrupt or command. In some instances, latency may be measured as the time elapsed between receipt of a message, interrupt or command and the processing or commencement of processing of the message, interrupt or command. Other measures of bus latency may be employed.

Certain aspects of this relate to a dynamic built-in self-test technique for identifying and correcting transient fault conditions in memory devices and circuits that implement the technique. In one aspect, an area efficient hardware-based implementation of a transient fault detection and correction algorithm is disclosed.

Figure 5:
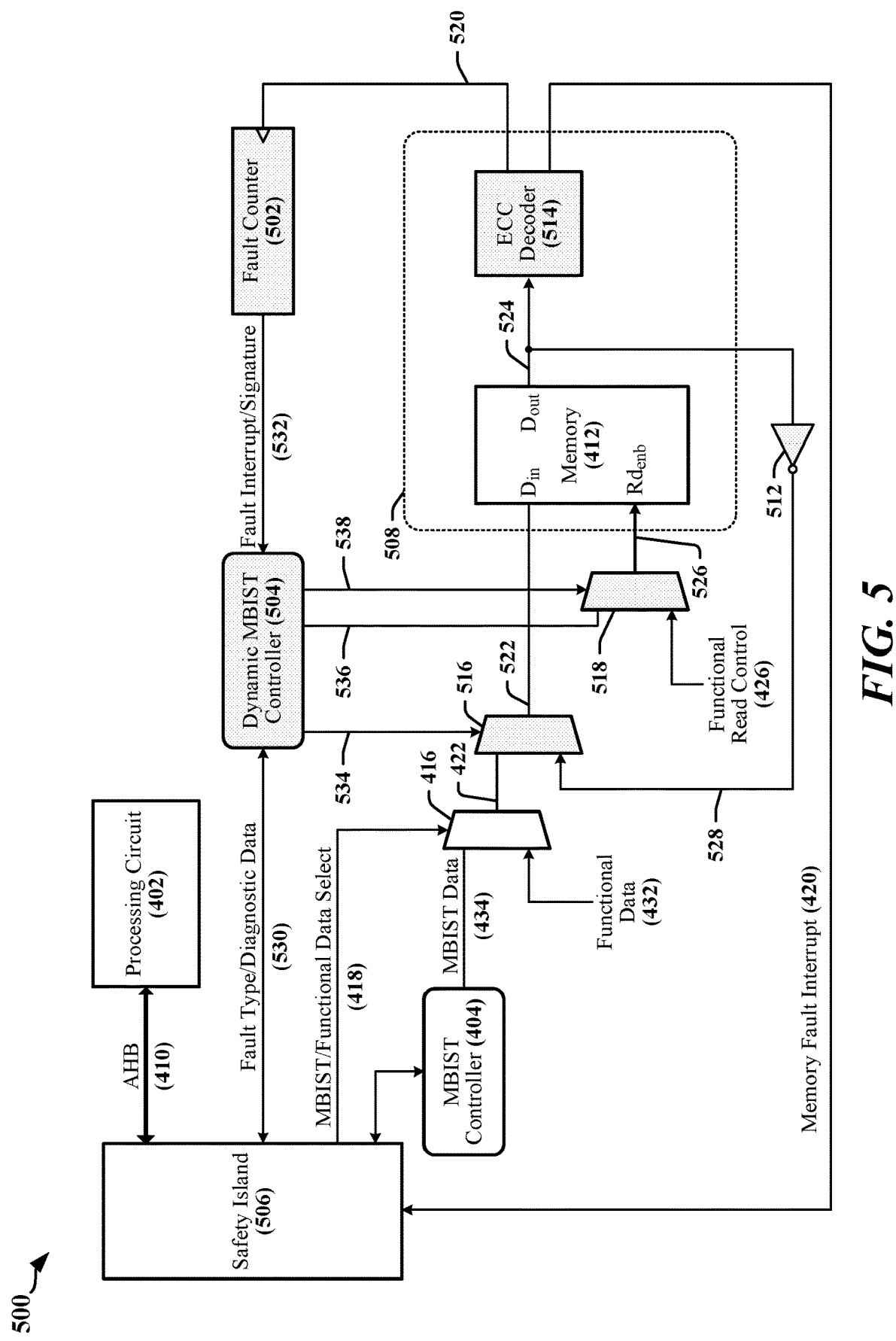
FIG. 5 illustrates a configuration of subsystems and circuits that may be used to perform self-testing and identification of transient fault conditions in accordance with certain aspects of this disclosure.

FIG. 5 illustrates a configuration of subsystems and circuits 500 that may be used to perform self-testing and identification of transient fault conditions in accordance with certain aspects of this disclosure. Certain of the subsystems and circuits 500 correspond to certain of the subsystems and circuits 400 illustrated in FIG. 4. The self-testing may be directed to a memory component 508. In the illustrated example, the memory component 508 corresponds to the external memory 304 coupled to the processing circuit 302. In other examples, the memory component 508 corresponds to the internal memory 314 of the processing circuit 302. The memory component 508 includes one or more memory devices 412 that can provide an addressable memory space spanning an address range. The memory component 508 further includes an ECC decoder 514 that is configured according to certain aspects of this disclosure to identify data errors within the memory space provided by the one or more memory devices 412. The ECC decoder 514 may assert a memory fault interrupt 420 that causes one or more circuits or modules in a safety island 506 to initiate corrective action, and/or to notify an operator or notify other components or elements of an autonomous or driver operated vehicle of the potential consequences of the data corruption. The safety island 506 may be configured according to certain aspects of this disclosure to initiate a dynamic self-testing procedure that can distinguish between transient and permanent fault conditions. In some instances, the safety island 506 may be coupled to a processing circuit 402 through a bus 410 that is operated in accordance with AHB protocols.

The safety island 506 may be configured to manage or monitor the operation of a conventional BIST controller, such as the MBIST controller 404 illustrated in FIG. 4. The MBIST controller 404 may be used to test certain aspects of the performance, accuracy and reliability of the memory component 508 during system initialization. In one example, a circuit in the safety island 506 may provide a control signal to a multiplexer 416 that selects between a test datastream 434 and functional data 432 that is received during normal operation. During system initialization, the multiplexer 416 selects the test datastream 434 to be provided as the data input 422 of the memory devices 412. The test datastream 434 may be written to multiple locations across the address range of the memory component 408. In one example, test data is written to every address in the address range. In another example, test data is written to random addresses throughout the address range. The MBIST controller 404 may then test the memory devices 412 to ensure the integrity of the stored data as described in relation to FIG. 4.

The data input 422 provided by multiplexer 416 is forwarded to the memory devices 412 through the output 522 of a second multiplexer 516 during system initialization and normal operation. A select signal 534 provided by a dynamic MBIST controller 504 may configure the second multiplexer 516 to select a different data flow when dynamic self-testing is enabled in order to identify transient fault conditions. Dynamic self-testing may be enabled when the ECC decoder 514 asserts a memory fault interrupt 420 during normal operations. The dynamic MBIST controller 504 may be activated by a circuit in the safety island 506. In one example, the dynamic MBIST controller 504 may be implemented using a finite state machine. In another example, the dynamic MBIST controller 504 may be implemented using a processing circuit. The safety island 506 may provide the dynamic MBIST controller 504 with information 530 that can identify or can be used to identify a fault type. The information 530 provided to the dynamic MBIST controller 504 may include diagnostic data maintained within the safety island 506 and/or other fault and diagnostic information received from the ECC decoder 514 or from the processing circuit 402.

The ECC decoder 514 may provide a fault detect signal 520 that includes a pulse, transition or edge that is generated for each fault detected. The fault detect signal 520 may be provided to a fault counter 502 that counts the number of faults detected while dynamic self-testing is enabled. In one example, the fault counter 502 may be reset when dynamic self-testing terminates. In another example, the fault counter 502 may be reset when dynamic self-testing commences. In some implementations, the fault counter 502 receives a fault signature from the ECC decoder 514 as part of, or together with the fault detect signal 520. The fault signature may be provided when the memory fault interrupt 420 is asserted and may include a memory device identifier, an address of the memory location that is indicated as being associated with the data storage fault, and/or a ECC corresponding to the asserted memory fault interrupt 420. Fault related information may be forwarded to the dynamic MBIST controller 504. In the illustrated example, the fault counter 502 forwards one or more signals 532 to the dynamic MBIST controller 504. The signals 532 may include the fault signature and an indication of the number of faults detected.

The dynamic MBIST controller 504 may generate memory control signals (not shown) that are needed or used to read data from the memory component 508 and to write data to the memory component 508. The dynamic MBIST controller 504 may generate a test version of a read enable signal 536. The dynamic MBIST controller 504 may provide a control signal 538 to a third multiplexer 518 that selects between the test version of the read enable signal 536 and the read enable signal 426 provided to the memory devices 412 during normal operation. The test version of the read enable signal 536 may be selected by the third multiplexer 518 to drive the read enable input 526 to the memory devices 412 during testing.

The dynamic MBIST controller 504 may cause address and control signals to be generated during dynamic self-testing. During each iteration of dynamic self-testing, the dynamic MBIST controller 504 may cause the data 524 at an identified fault location to be read from the memory devices 412. The data 524 is inverted by an inverter 512 and inverted data 528 is fed back to the memory devices 412 through the second multiplexer 516. The dynamic MBIST controller 504 may cause the inverted data 528 to be written to the memory devices 412 at the identified fault location. During each iteration of dynamic self-testing, the ECC decoder 514 indicates whether a fault is detected in the data read from the identified fault location. Identification of a fault condition causes the fault counter 502 to be incremented. If no fault is detected, then circuits or modules in the safety island 506 may determine that the identified fault is a transient fault. In some implementations, the identification of a transient fault is made after a single iteration of dynamic self-testing have yielded no fault indication. In some implementations, the identification of a transient fault is made after multiple iterations of dynamic self-testing have yielded no fault indication.

For the purposes of this disclosure, a transient fault may be defined as a fault that endures for several microseconds before the corresponding memory location returns to a fully operable state. The fault counter 502 may be configured to extend a dynamic self-testing procedure for a sufficient period of time to permit the fault condition to clear and allow the affected memory location to return to a fully operable state. In certain implementations, a circuit or module of the safety island 506 may configure a programmable register with a threshold value that defines a maximum count value for the fault counter 502. The threshold value may correspond to a number of iterations of the dynamic self-testing procedure that ensures that a transient fault will be cleared. In certain implementations, a circuit or module of the safety island 506 may configure the fault counter 502 with an initial count value from which the fault counter 502 will count up or count down until an overflow or zero value occurs. In these implementations, the initial count value is configured to enable a number of iterations of the dynamic self-testing procedure that ensures that a transient fault will be cleared.

The dynamic MBIST controller 504 may monitor the output of the fault counter 502. The dynamic MBIST controller 504 may signal the safety island 506 that a permanent fault has been detected if the output of the fault counter 502 reaches or passes a threshold value. In one example, the threshold value may be preconfigured to be 100. In another example, the threshold value may be preconfigured to be 1,000. In other examples, the threshold value may be preconfigured to have a value that is less than 100. In still other examples, the threshold value may be preconfigured to have a value that is greater than 1,000. In some instances, the threshold value may be preconfigured to have a value falls within the range of 100 to 1,000.

Figure 6:
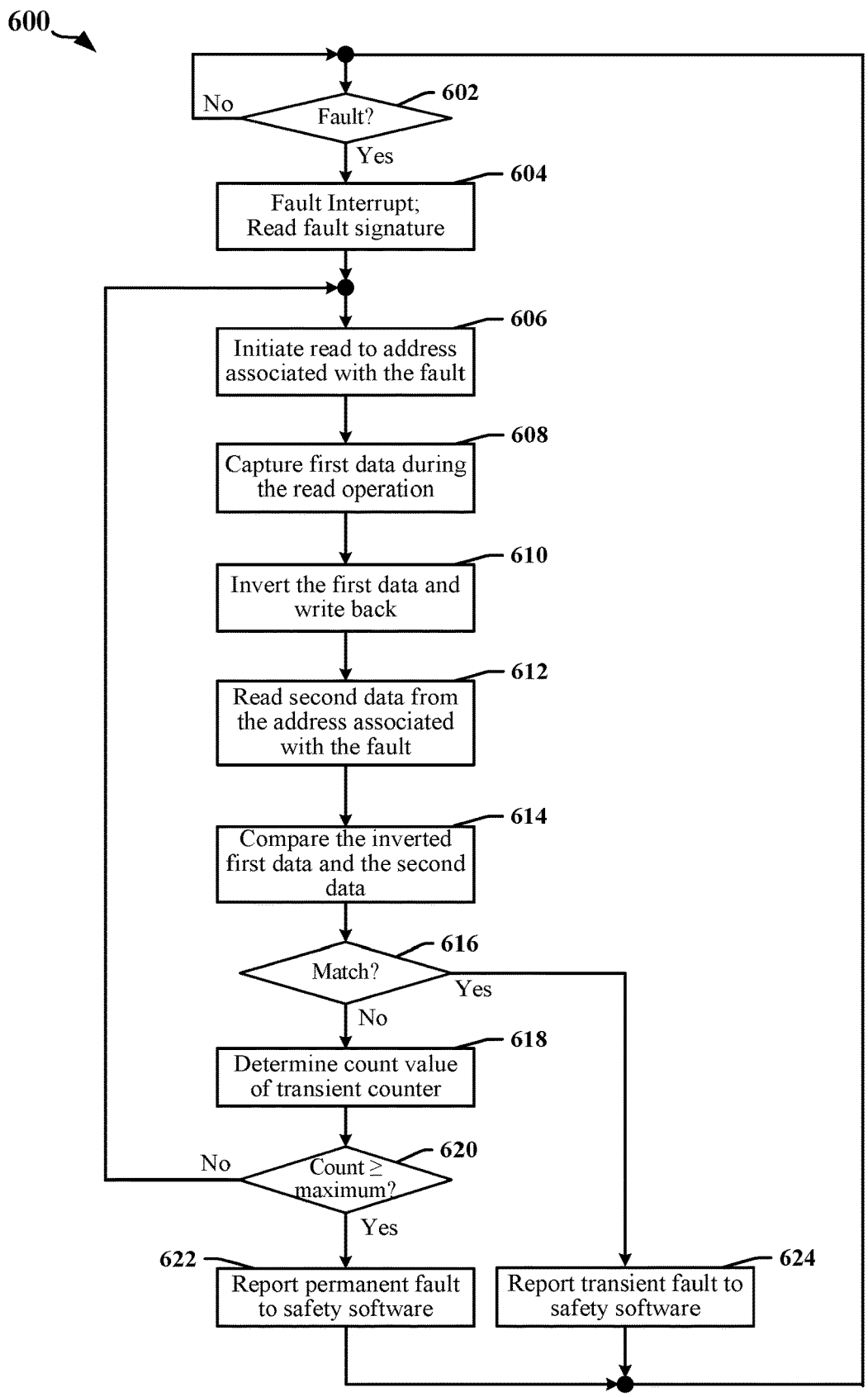
FIG. 6 is a flowchart that illustrates certain aspects of a dynamic self-testing procedure according to certain aspects of this disclosure that can be implemented using the subsystems and circuits 500 illustrated in FIG. 5.

FIG. 6 is a flowchart 600 that illustrates certain aspects of a dynamic self-testing procedure according to certain aspects of this disclosure that can be implemented using the subsystems and circuits 500 illustrated in FIG. 5. In some implementations, the dynamic self-testing procedure may be implemented, managed or controlled by the dynamic MBIST controller 504.

The dynamic MBIST controller 504 is initially in an idle or inactive state as illustrated by block 602. The dynamic MBIST controller 504 remains at block 602 until a read fault in the memory component 508 is indicated by the ECC decoder 514. The fault indication triggers the dynamic MBIST controller 504 and the dynamic self-testing procedure begins at block 604. The dynamic MBIST controller 504 may halt incoming memory access requests. Memory access may be stalled until the fault is cleared as transient or other corrective action has been taken to restore the memory component 508 to an operable state. In one example, a subsystem reset may be performed in an attempt to clear and restore permanently faulty memory. In another example, the address or range of addresses of permanently faulty memory may be recorded and access to the associated memory may be blocked.

At block 604, the dynamic MBIST controller 504 may receive or retrieve a fault signature and/or other provided with a fault interrupt by the ECC decoder 514 after a fault has been indicated. The fault signature may include a memory device identifier, an address of the faulty location, and an associated ECC. The ECC may be generated as a Hamming code, a Hsiao code, a Reed-Solomon error correction code, or the like. The ECC may enable single-bit error correction and double-bit error detection (SEC-DED).

At block 606, the dynamic MBIST controller 504 may initiate a read operation to retrieve first data stored at the address of the memory location identified as being faulty. At block 608, the dynamic MBIST controller 504 may capture the first data retrieved from the memory location identified as being faulty. At block 610, the dynamic MBIST controller 504 may cause an inverted version of the first retrieved data to be written back to the address of the memory location identified as being faulty.

At block 612, the dynamic MBIST controller 504 may read second data from the memory location identified as being faulty. In other words, the dynamic MBIST controller 504 may read from the memory location identified as being faulty again. At block 614, the dynamic MBIST controller 504 may compare the second data with expected data. The expected data may be the inverted version of the first retrieved data. At block 616, the dynamic MBIST controller 504 may determine whether the second data matches the inverted version of the first retrieved data. If the second data matches the inverted version of the first retrieved data, then the dynamic MBIST controller 504 may report to the safety island 506 at block 624 that the fault condition was a transient fault. If the second data does not match the inverted version of the first retrieved data, then the dynamic self-testing procedure continues at block 618.

At block 618, the dynamic MBIST controller 504 may read the output of the fault counter 502 and compare the count value to a threshold value. In the illustrated example, the fault counter 502 is automatically incremented when the ECC decoder 514 asserts a memory fault interrupt 420. In some implementations, the dynamic MBIST controller 504 increments the fault counter 502 at block 618. At block 620, the dynamic MBIST controller 504 may determine whether the output of the fault counter 502 equals or exceeds a threshold value. The threshold value may correspond to a number of iterations of the dynamic self-testing procedure that ensures that a transient fault will be cleared. The threshold value may be preconfigured based on a maximum latency requirement or based on other application requirements. If the output of the fault counter 502 equals or exceeds the threshold value then, at block 622, the dynamic MBIST controller 504 may report to the safety island 506 that the fault condition is a permanent fault. If the output of the fault counter 502 is less than the threshold value then a next iteration of the dynamic self-testing procedure commences at block 606.

Examples of Processing Circuits and Methods

Figure 7:
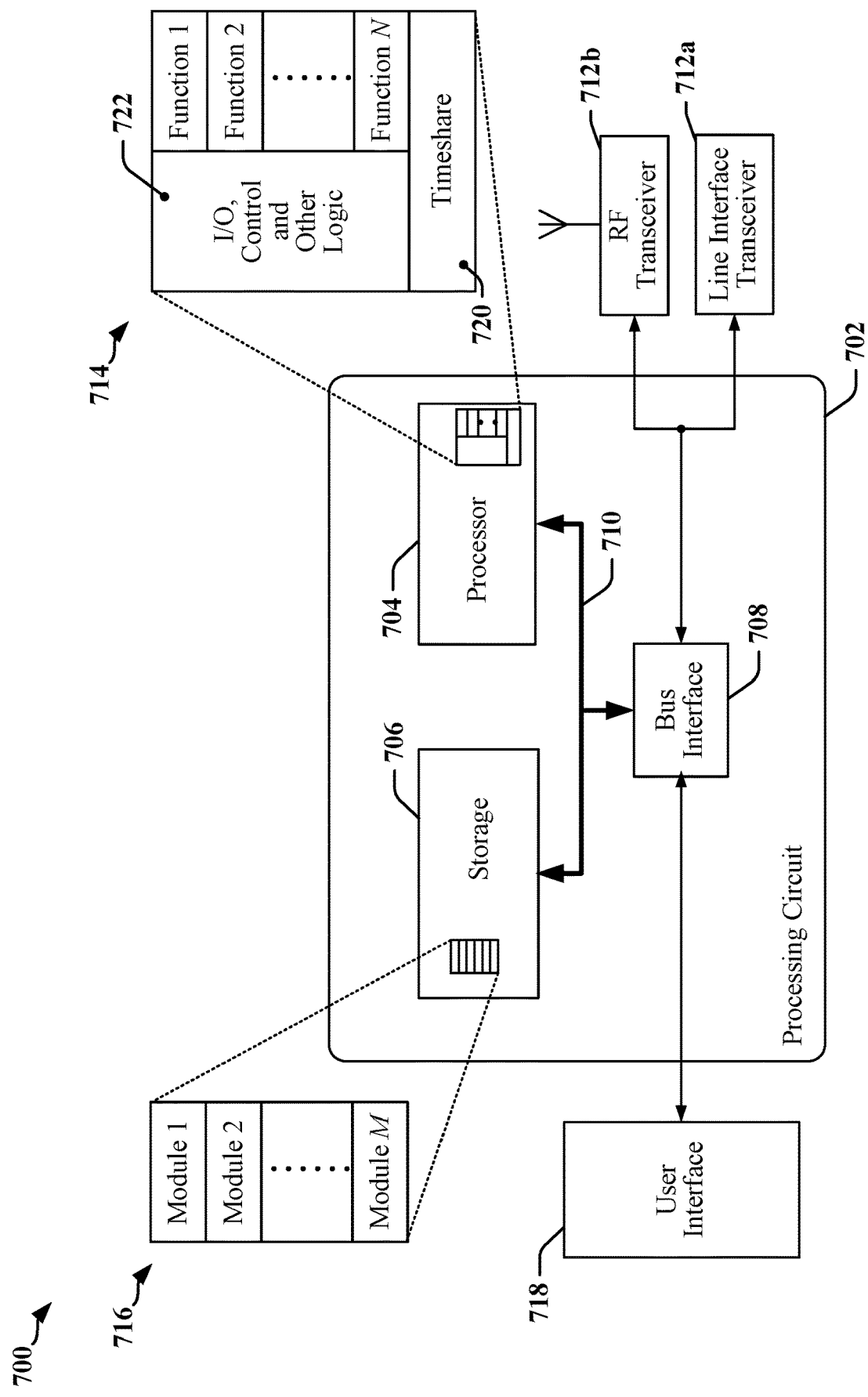
FIG. 7 illustrates one example of an apparatus employing a processing circuit that may be adapted in accordance with certain aspects disclosed herein.

FIG. 7 is a diagram illustrating an example of a hardware implementation for an apparatus 700. In some examples, the apparatus 700 may perform one or more functions disclosed herein. In accordance with various aspects of the disclosure, an element, or any portion of an element, or any combination of elements as disclosed herein may be implemented using a processing circuit 702. The processing circuit 702 may include one or more processors 704 that are controlled by some combination of hardware and software modules. Examples of processors 704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 704 may include specialized processors that perform specific functions, and that may be configured, augmented or controlled by one of the software modules 716. The one or more processors 704 may be configured through a combination of software modules 716 loaded during initialization, and further configured by loading or unloading one or more software modules 716 during operation.

In the illustrated example, the processing circuit 702 may be implemented with a bus architecture, represented generally by the bus 710. The bus 710 may include any number of interconnecting buses and bridges depending on the specific application of the processing circuit 702 and the overall design constraints. The bus 710 links together various circuits including the one or more processors 704, and storage 706. Storage 706 may include memory devices and mass storage devices, and may be referred to herein as computer-readable media and/or processor-readable media. The bus 710 may also link various other circuits such as timing sources, timers, peripherals, voltage regulators, and power management circuits. A bus interface 708 may provide an interface between the bus 710 and one or more transceivers 712a, 712b. A transceiver 712a, 712b may be provided for each networking technology supported by the processing circuit. In some instances, multiple networking technologies may share some or all of the circuitry or processing modules found in a transceiver 712a, 712b. Each transceiver 712a, 712b provides a means for communicating with various other apparatus over a transmission medium. In one example, a transceiver 712a may be used to couple the apparatus 700 to a multi-wire bus. In another example, a transceiver 712b may be used to connect the apparatus 700 to a radio access network. Depending upon the nature of the apparatus 700, a user interface 718 (e.g., keypad, display, speaker, microphone, joystick) may also be provided, and may be communicatively coupled to the bus 710 directly or through the bus interface 708.

A processor 704 may be responsible for managing the bus 710 and for general processing that may include the execution of software stored in a computer-readable medium that may include the storage 706. In this respect, the processing circuit 702, including the processor 704, may be used to implement any of the methods, functions and techniques disclosed herein. The storage 706 may be used for storing data that is manipulated by the processor 704 when executing software, and the software may be configured to implement certain methods disclosed herein.

One or more processors 704 in the processing circuit 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 706 or in an external computer-readable medium. The external computer-readable medium and/or storage 706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 706 may also include, by way of example, a carrier wave, a transmission line, and any other suitable medium for transmitting software and/or instructions that may be accessed and read by a computer. Computer-readable medium and/or the storage 706 may reside in the processing circuit 702, in the processor 704, external to the processing circuit 702, or be distributed across multiple entities including the processing circuit 702. The computer-readable medium and/or storage 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 706 may maintain software maintained and/or organized in loadable code segments, modules, applications, programs, etc., which may be referred to herein as software modules 716. Each of the software modules 716 may include instructions and data that, when installed or loaded on the processing circuit 702 and executed by the one or more processors 704, contribute to a run-time image 714 that controls the operation of the one or more processors 704. When executed, certain instructions may cause the processing circuit 702 to perform functions in accordance with certain methods, algorithms and processes described herein.

Some of the software modules 716 may be loaded during initialization of the processing circuit 702, and these software modules 716 may configure the processing circuit 702 to enable performance of the various functions disclosed herein. For example, some software modules 716 may configure internal devices and/or logic circuits 722 of the processor 704, and may manage access to external devices such as a transceiver 712a, 712b, the bus interface 708, the user interface 718, timers, mathematical coprocessors, and so on. The software modules 716 may include a control program and/or an operating system that interacts with interrupt handlers and device drivers, and that controls access to various resources provided by the processing circuit 702. The resources may include memory, processing time, access to a transceiver 712a, 712b, the user interface 718, and so on.

One or more processors 704 of the processing circuit 702 may be multifunctional, whereby some of the software modules 716 are loaded and configured to perform different functions or different instances of the same function. The one or more processors 704 may additionally be adapted to manage background tasks initiated in response to inputs from the user interface 718, the transceiver 712a, 712b, and device drivers, for example. To support the performance of multiple functions, the one or more processors 704 may be configured to provide a multitasking environment, whereby each of a plurality of functions is implemented as a set of tasks serviced by the one or more processors 704 as needed or desired. In one example, the multitasking environment may be implemented using a timesharing program 720 that passes control of a processor 704 between different tasks, whereby each task returns control of the one or more processors 704 to the timesharing program 720 upon completion of any outstanding operations and/or in response to an input such as an interrupt. When a task has control of the one or more processors 704, the processing circuit is effectively specialized for the purposes addressed by the function associated with the controlling task. The timesharing program 720 may include an operating system, a main loop that transfers control on a round-robin basis, a function that allocates control of the one or more processors 704 in accordance with a prioritization of the functions, and/or an interrupt driven main loop that responds to external events by providing control of the one or more processors 704 to a handling function.

In one example, the processing circuit 702 may be implemented in, or operate as a self-test circuit that includes a counter clocked by a fault indication output by an ECC decoder. The processors 704 may include a controller that is activated by a fault interrupt signal asserted by the ECC decoder and configured, when activated, to iteratively read first data from a memory location that is indicated by the ECC decoder to be associated with a data storage fault, cause an inverted version of the first data to be written back to the memory location, read second data from the memory location after the inverted version of the first data is written back to the memory location, report the data storage fault as a transient fault to a safety subsystem when the second data has an expected value, report the data storage fault as a permanent fault to the safety subsystem when the second data does not have the expected value and an output of the counter reaches a threshold value. The controller may be deactivated when the data storage fault is reported as a transient fault or as a permanent fault to the safety subsystem.

In some implementations, the controller is further configured to receive a fault signature from the ECC decoder. The fault signature may be received when the fault interrupt signal is asserted. The fault signature may include a memory device identifier. The fault signature may include an address of the memory location that is indicated as being associated with the data storage fault. The fault signature may include an ECC associated with the fault indication. In some implementations, the fault signature includes the memory device identifier, the address of the memory location, and the ECC associated with the fault indication.

In certain examples, the safety subsystem is provided in an autonomously operated vehicle and is operationally isolated from a processing circuit that comprises a memory device that includes the memory location. Incoming access requests directed to a memory device that includes the memory location may be halted while the controller is activated.

In some implementations, the threshold value is configured by the safety subsystem. The threshold value may correspond to a number of data reads or data writes that ensures that a transient fault is cleared before the data storage fault is reported as a transient fault or as a permanent fault to the safety subsystem.

Figure 8:
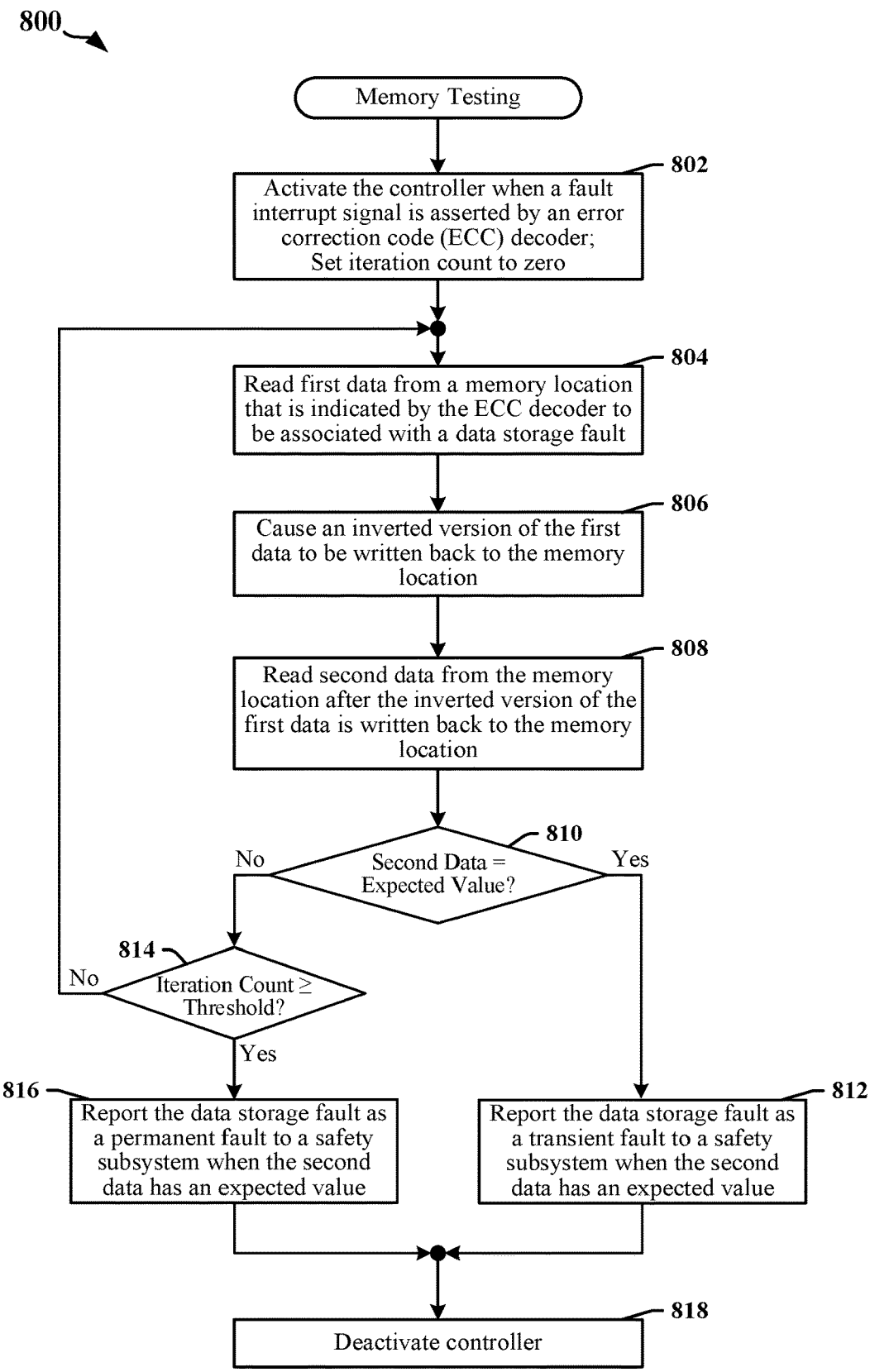
FIG. 8 is a flowchart that illustrates a method for testing memory using a controller in accordance with certain aspects disclosed herein.

FIG. 8 is a flowchart 800 of a method for testing memory using a controller. The controller may be an MBIST controller. The testing may be performed when a fault condition is detected during normal system operation. At block 802, the controller may be activated when a fault interrupt signal is asserted by an ECC decoder. The controller may initiate and/or manage one or more iterations of a procedure illustrated in blocks 804-816.

At block 804, the controller may read first data from a memory location that is indicated by the ECC decoder to be associated with a data storage fault. At block 806, the controller may cause an inverted version of the first data to be written back to the memory location. At block 808, the controller may read second data from the memory location after the inverted version of the first data is written back to the memory location. At block 810, the controller may compare the second data with an expected value. In one example, the second value corresponds to the inverted version of the first data. When the second data equals the expected value, the controller may report the data storage fault as a transient fault to a safety subsystem at block 812. When the second data is not the same as the expected value, the method proceeds to block 814.

At block 814, the controller may determine whether a threshold number of iterations has been executed. The number of iterations may be tracked by a counter that responds to an error detection signal asserted by the ECC decoder after a read operation results in detection of a fault condition. The number of iterations may be cleared or reset after a fault-free read operation results. When the threshold number of iterations has been executed, the controller may report the data storage fault as a permanent fault to the safety subsystem at block 816.

At block 818, the controller may be deactivated when the data storage fault is reported as a transient fault or as a permanent fault to the safety subsystem.

In some implementations, the controller may receive a fault signature from the ECC decoder when the fault interrupt signal is asserted. The fault signature may include a memory device identifier, and an address of the memory location that is indicated as being associated with the data storage fault. The fault signature may additionally include an ECC associated with the fault indication.

In certain examples, the safety subsystem is provided in an autonomously operated vehicle and is operationally isolated from a processing circuit that comprises a memory device that includes the memory location. Incoming access requests directed to a memory device that includes the memory location may be halted while the controller is activated.

In some implementations, the threshold value is configured by the safety subsystem. The threshold value may correspond to a number of data reads or data writes that ensures that a transient fault is cleared before the data storage fault is reported as a transient fault or as a permanent fault to the safety subsystem.

Figure 9:
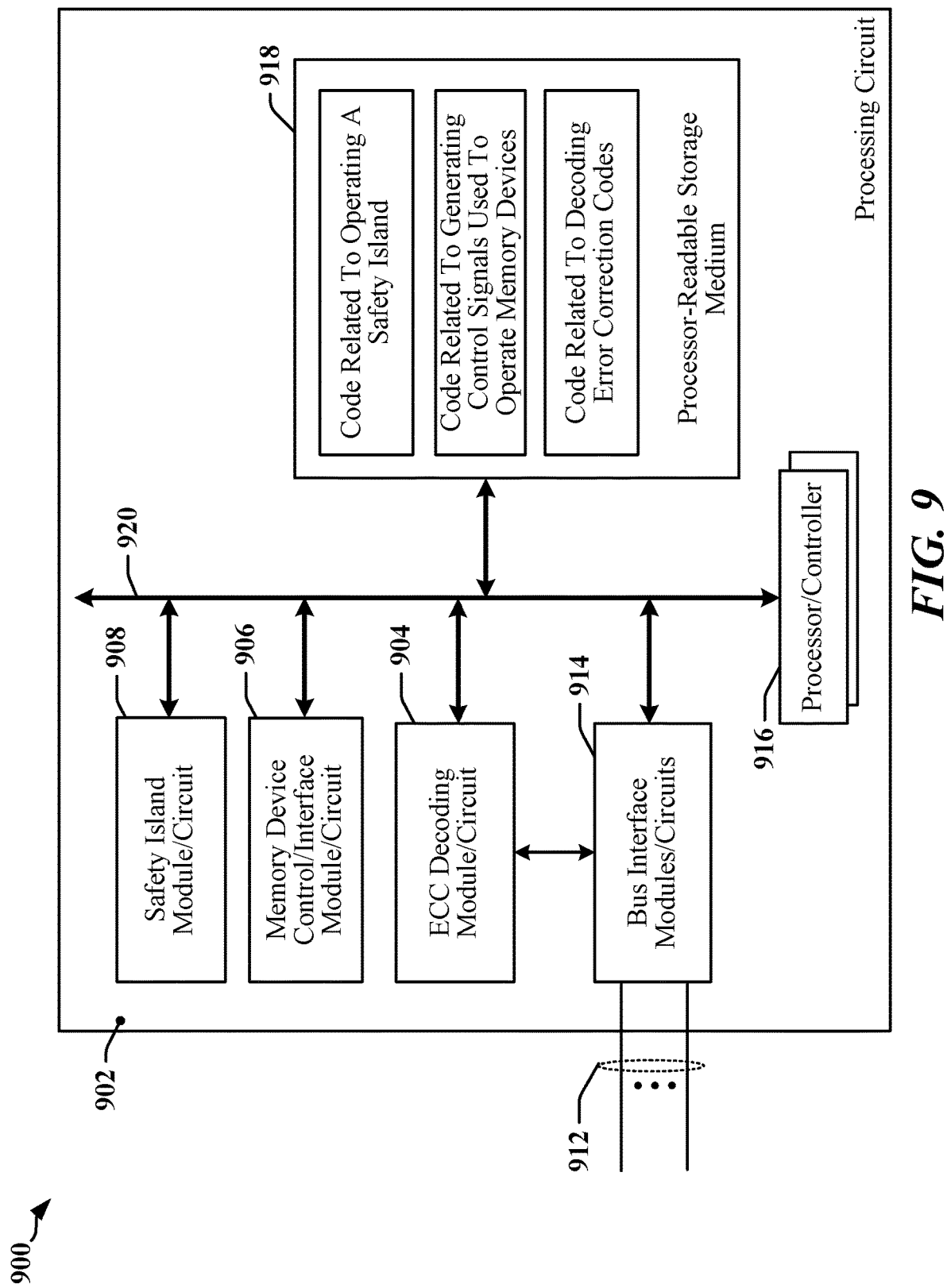
FIG. 9 illustrates a first example of a hardware implementation for a self-testing apparatus adapted in accordance with certain aspects disclosed herein.

FIG. 9 is a diagram illustrating a first example of a hardware implementation for an apparatus 900 employing a processing circuit 902. The processing circuit typically has one or more microprocessors, microcontrollers, digital signal processors, sequencers and/or state machines, represented generally by the processors 916. The processing circuit 902 may be implemented with a bus architecture, represented generally by the bus 920. The bus 920 may include any number of interconnecting buses and bridges depending on the specific application of the processing circuit 902 and the overall design constraints. The bus 920 links together various circuits including multiple processors 916, the modules or circuits 904, 906 and 908 and the processor-readable storage medium 918. A bus interface circuit and/or module 914 may be provided to support communications over one or more communication links 912. The bus 920 may also link various other circuits such as timing sources, peripherals, voltage regulators, and power management circuits, which are well known in the art, and therefore, will not be described any further.

The processors 916 may be responsible for general processing, including the execution of software, code and/or instructions stored on the processor-readable storage medium 918. The processor-readable storage medium 918 may include a non-transitory storage medium. The software, when executed by the processors 916, causes the processing circuit 902 to perform the various functions described supra for any particular apparatus. The processor-readable storage medium may be used for storing data that is manipulated by the processors 916 when executing software. The processing circuit 902 further includes at least one of the modules 904, 906 and 908. The modules 904, 906 and 908 may be software modules running in the processors 916, resident/stored in the processor-readable storage medium 918, one or more hardware modules coupled to the processors 916, or some combination thereof. The modules 904, 906 and 908 may include microcontroller instructions, state machine configuration parameters, or some combination thereof.

In one configuration, the apparatus 900 includes modules and/or circuits 904 configured or adapted to configure and manage data protection requirements consistent with safety standards and the modules and/or circuits 904 may include an ECC. In one example, the data protection requirements are defined by one or more of the ASIL levels specified by ISO 26262. The apparatus 900 may further include modules and/or circuits 906 configured or adapted to generate control signals used to access memory devices during self-testing procedures. The apparatus 900 may further include modules and/or circuits 908 configured or adapted to operate a safety island or to communicate with a safety island through communication of commands, status information and/or control signals.

The apparatus 900 may include means for activating the controller when a fault interrupt signal is asserted by an ECC decoder, and while the controller is activated, iteratively reading first data from a memory location that is indicated by the ECC decoder to be associated with a data storage fault; causing an inverted version of the first data to be written back to the memory location; reading second data from the memory location after the inverted version of the first data is written back to the memory location; reporting the data storage fault as a transient fault to a safety subsystem when the second data has an expected value; and reporting the data storage fault as a permanent fault to the safety subsystem after a threshold number of iterations has been executed in which the second data does not have the expected value. The controller may be deactivated when the data storage fault is reported as a transient fault or as a permanent fault to the safety subsystem.

In some implementations, the controller may receive a fault signature from the ECC decoder when the fault interrupt signal is asserted. The fault signature may include a memory device identifier, and an address of the memory location that is indicated as being associated with the data storage fault. The fault signature may additionally include an ECC associated with the fault indication.

In certain examples, the safety subsystem is provided in an autonomously operated vehicle and is operationally isolated from a processing circuit that comprises a memory device that includes the memory location. Incoming access requests directed to a memory device that includes the memory location may be halted while the controller is activated.

In some implementations, the threshold value is configured by the safety subsystem. The threshold value may correspond to a number of data reads or data writes that ensures that a transient fault is cleared before the data storage fault is reported as a transient fault or as a permanent fault to the safety subsystem.

The processor-readable storage medium 918 may include code or instructions that, when executed by a controller in a processing circuit 902, causes the processing circuit 902 to activate the controller when a fault interrupt signal is asserted by an ECC decoder. While the controller is activated, the code or instructions may cause the processing circuit 902 to iteratively read first data from a memory location that is indicated by the ECC decoder to be associated with a data storage fault, cause an inverted version of the first data to be written back to the memory location, read second data from the memory location after the inverted version of the first data is written back to the memory location, report the data storage fault as a transient fault to a safety subsystem when the second data has an expected value, and report the data storage fault as a permanent fault to the safety subsystem after a threshold number of iterations has been executed in which the second data does not have the expected value. The controller may be deactivated when the data storage fault is reported as a transient fault or as a permanent fault to the safety subsystem.

In some implementations, the processing circuit 902 may receive a fault signature from the ECC decoder when the fault interrupt signal is asserted. The fault signature may include a memory device identifier, and an address of the memory location that is indicated as being associated with the data storage fault. The fault signature may additionally include an ECC associated with the fault indication.

In certain examples, the safety subsystem is provided in an autonomously operated vehicle and is operationally isolated from a processing circuit that comprises a memory device that includes the memory location. Incoming access requests directed to a memory device that includes the memory location may be halted while the controller is activated.

In some implementations, the threshold value is configured by the safety subsystem. The threshold value may correspond to a number of data reads or data writes that ensures that a transient fault is cleared before the data storage fault is reported as a transient fault or as a permanent fault to the safety subsystem.

Some implementation examples are described in the following numbered clauses:

1. A self-test circuit, comprising: a counter clocked by a fault indication output by an error correction code (ECC) decoder; and a controller activated by a fault interrupt signal asserted by the ECC decoder and configured, when activated, to iteratively: read first data from a memory location that is indicated by the ECC decoder to be associated with a data storage fault; cause an inverted version of the first data to be written back to the memory location; read second data from the memory location after the inverted version of the first data is written back to the memory location; report the data storage fault as a transient fault to a safety subsystem when the second data has an expected value; and report the data storage fault as a permanent fault to the safety subsystem when the second data does not have the expected value and an output of the counter reaches a threshold value, wherein the controller is deactivated when the data storage fault is reported as a transient fault or as a permanent fault to the safety subsystem.
2. The self-test circuit as described in clause 1, wherein the controller is further configured to: receive a fault signature from the ECC decoder, wherein the fault signature is received when the fault interrupt signal is asserted and comprises a memory device identifier, and an address of the memory location that is indicated as being associated with the data storage fault.
3. The self-test circuit as described in clause 2, wherein the fault signature further comprises an ECC corresponding to the fault interrupt signal.
4. The self-test circuit as described in any of clauses 1-3, wherein the safety subsystem is provided in an autonomously operated vehicle and is operationally isolated from a processing circuit that comprises a memory device that includes the memory location.
5. The self-test circuit as described in any of clauses 1-4, wherein incoming access requests directed to a memory device that includes the memory location are halted while the controller is activated.
6. The self-test circuit as described in any of clauses 1-5, wherein the threshold value is configured by the safety subsystem.
7. The self-test circuit as described in any of clauses 1-6, wherein the threshold value corresponds to a number of data reads or data writes that ensures that a transient fault is cleared before the data storage fault is reported as a transient fault or as a permanent fault to the safety subsystem.
8. A method for testing memory using a controller, comprising: activating the controller when a fault interrupt signal is asserted by an error correction code (ECC) decoder; and while the controller is activated, iteratively: reading first data from a memory location that is indicated by the ECC decoder to be associated with a data storage fault; causing an inverted version of the first data to be written back to the memory location; reading second data from the memory location after the inverted version of the first data is written back to the memory location; reporting the data storage fault as a transient fault to a safety subsystem when the second data has an expected value; and reporting the data storage fault as a permanent fault to the safety subsystem after a threshold number of iterations has been executed in which the second data does not have the expected value, wherein the controller is deactivated when the data storage fault is reported as a transient fault or as a permanent fault to the safety subsystem.

9. The method as described in clause 8, further comprising: receiving a fault signature from the ECC decoder, wherein the fault signature is received when the fault interrupt signal is asserted and comprises a memory device identifier, and an address of the memory location that is indicated as being associated with the data storage fault.

10. The method as described in clause 9, wherein the fault signature further comprises an ECC corresponding to the fault interrupt signal.

11. The method as described in any of clauses 8-10, wherein the safety subsystem is provided in an autonomously operated vehicle and is operationally isolated from a processing circuit that comprises a memory device that includes the memory location.

12. The method as described in any of clauses 8-11, wherein incoming access requests directed to a memory device that includes the memory location are halted while the controller is activated.

13. The method as described in any of clauses 8-12, wherein the threshold value is configured by the safety subsystem.

14. The method as described in any of clauses 8-13, wherein the threshold value corresponds to a number of data reads or data writes that ensures that a transient fault is cleared before the data storage fault is reported as a transient fault or as a permanent fault to the safety subsystem.

15. A processor-readable storage medium comprising code that, when executed by a controller in a processing circuit, causes the processing circuit to: activate the controller when a fault interrupt signal is asserted by an error correction code (ECC) decoder; and while the controller is activated, iteratively: read first data from a memory location that is indicated by the ECC decoder to be associated with a data storage fault; cause an inverted version of the first data to be written back to the memory location; read second data from the memory location after the inverted version of the first data is written back to the memory location; report the data storage fault as a transient fault to a safety subsystem when the second data has an expected value; and report the data storage fault as a permanent fault to the safety subsystem after a threshold number of iterations has been executed in which the second data does not have the expected value, wherein the controller is deactivated when the data storage fault is reported as a transient fault or as a permanent fault to the safety subsystem.

16. The processor-readable storage medium as described in clause 15, wherein the code further causes the processing circuit to: receive a fault signature from the ECC decoder, wherein the fault signature is received when the fault interrupt signal is asserted and comprises a memory device identifier, and an address of the memory location that is indicated as being associated with the data storage fault.

17. The processor-readable storage medium as described in clause 16, wherein the fault signature further comprises an ECC corresponding to the fault interrupt signal.

18. The processor-readable storage medium as described in any of clauses 15-17, wherein the safety subsystem is provided in an autonomously operated vehicle and is operationally isolated from a processing circuit that comprises a memory device that includes the memory location.

19. The processor-readable storage medium as described in any of clauses 15-18, wherein the threshold value is configured by the safety subsystem.

20. The processor-readable storage medium as described in any of clauses 15-19, wherein the threshold value corresponds to a number of data reads or data writes that ensures that a transient fault is cleared before the data storage fault is reported as a transient fault or as a permanent fault to the safety subsystem.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A self-test circuit, comprising:
a counter clocked by a fault indication output by an error correction code (ECC) decoder; and
a controller activated by a fault interrupt signal asserted by the ECC decoder and configured, when activated, to iteratively:
read first data from a memory location that is indicated by the ECC decoder to be associated with a data storage fault;
cause an inverted version of the first data to be written back to the memory location;

read second data from the memory location after the inverted version of the first data is written back to the memory location;

report the data storage fault as a transient fault to a safety subsystem when the second data has an expected value; and report the data storage fault as a permanent fault to the safety subsystem when the second data does not have the expected value and an output of the counter reaches a threshold value, wherein the controller is deactivated when the data storage fault is reported as a transient fault or as a permanent fault to the safety subsystem.

2. The self-test circuit of claim 1, wherein the controller is further configured to:

receive a fault signature from the ECC decoder, wherein the fault signature is received when the fault interrupt signal is asserted and comprises a memory device identifier, and an address of the memory location that is indicated as being associated with the data storage fault.

3. The self-test circuit of claim 2, wherein the fault signature further comprises an ECC corresponding to the fault interrupt signal.

4. The self-test circuit of claim 1, wherein the safety subsystem is provided in an autonomously operated vehicle and is operationally isolated from a processing circuit that comprises a memory device that includes the memory location.

5. The self-test circuit of claim 1, wherein incoming access requests directed to a memory device that includes the memory location are halted while the controller is activated.

6. The self-test circuit of claim 1, wherein the threshold value is configured by the safety subsystem.

7. The self-test circuit of claim 1, wherein the threshold value corresponds to a number of data reads or data writes that ensures that a transient fault is cleared before the data storage fault is reported as a transient fault or as a permanent fault to the safety subsystem.

8. A method for testing memory using a controller, comprising:

activating the controller when a fault interrupt signal is asserted by an error correction code (ECC) decoder; and while the controller is activated, iteratively:

reading first data from a memory location that is indicated by the ECC decoder to be associated with a data storage fault;

causing an inverted version of the first data to be written back to the memory location;

reading second data from the memory location after the inverted version of the first data is written back to the memory location;

reporting the data storage fault as a transient fault to a safety subsystem when the second data has an expected value; and reporting the data storage fault as a permanent fault to the safety subsystem after a threshold number of iterations has been executed in which the second data does not have the expected value, wherein the controller is deactivated when the data storage fault is reported as a transient fault or as a permanent fault to the safety subsystem.

9. The method of claim 8, further comprising:

receiving a fault signature from the ECC decoder, wherein the fault signature is received when the fault interrupt signal is asserted and comprises a memory device identifier, and an address of the memory location that is indicated as being associated with the data storage fault.

10. The method of claim 9, wherein the fault signature further comprises an ECC corresponding to the fault interrupt signal.

11. The method of claim 8, wherein the safety subsystem is provided in an autonomously operated vehicle and is operationally isolated from a processing circuit that comprises a memory device that includes the memory location.

12. The method of claim 8, wherein incoming access requests directed to a memory device that includes the memory location are halted while the controller is activated.

13. The method of claim 8, wherein the threshold number is configured by the safety subsystem.

14. The method of claim 8, wherein the threshold number of iterations corresponds to a number of data reads or data writes that ensures that a transient fault is cleared before the data storage fault is reported as a transient fault or as a permanent fault to the safety subsystem.

15. A processor-readable storage medium comprising code that, when executed by a controller in a processing circuit, causes the processing circuit to:

activate the controller when a fault interrupt signal is asserted by an error correction code (ECC) decoder; and while the controller is activated, iteratively:

read first data from a memory location that is indicated by the ECC decoder to be associated with a data storage fault;

cause an inverted version of the first data to be written back to the memory location;

read second data from the memory location after the inverted version of the first data is written back to the memory location;

report the data storage fault as a transient fault to a safety subsystem when the second data has an expected value; and report the data storage fault as a permanent fault to the safety subsystem after a threshold number of iterations has been executed in which the second data does not have the expected value, wherein the controller is deactivated when the data storage fault is reported as a transient fault or as a permanent fault to the safety subsystem.

16. The processor-readable storage medium of claim 15, wherein the code further causes the processing circuit to:

receive a fault signature from the ECC decoder, wherein the fault signature is received when the fault interrupt signal is asserted and comprises a memory device identifier, and an address of the memory location that is indicated as being associated with the data storage fault.

17. The processor-readable storage medium of claim 16, wherein the fault signature further comprises an ECC corresponding to the fault interrupt signal.

18. The processor-readable storage medium of claim 15, wherein the safety subsystem is provided in an autonomously operated vehicle and is operationally isolated from a processing circuit that comprises a memory device that includes the memory location.

19. The processor-readable storage medium of claim 15, wherein threshold number is configured by the safety subsystem.

20. The processor-readable storage medium of claim 15, wherein the threshold value corresponds to a number of data reads or data writes that ensures that a transient fault is cleared before the data storage fault is reported as a transient fault or as a permanent fault to the safety subsystem.

\* \* \* \* \*